May 26, 1959

A. PRATT ET AL 2,888,675

WATER BORNE INFLATABLE RADAR REFLECTOR UNIT

Filed Feb. 7, 1956

INVENTORS
AMASA PRATT
HENRY W. ROYCE

BY *Julian C. Renfro*
ATTORNEY

2,888,675

WATER BORNE INFLATABLE RADAR REFLECTOR UNIT

Amasa Pratt, Towson, and Henry W. Royce, Rogers Forge, Md., assignors to The Martin Company, Middle River, Md., a corporation of Maryland Application February 7, 1956, Serial No. 563,929

10 Claims. (Cl. 343—18)

This invention relates to a unitary device adapted to permit of radar indication, at relatively great distances or long ranges, the location of personnel or equipment afloat at sea, and particularly to a water-borne, self-floating radar reflector unit comprising a flexible radar reflector wholly enclosed, and attached to and within an inflatable radar-transparent balloon.

Radar beams from searching air or seacraft are used to locate personnel or equipment afloat at sea. However, the object to be located is usually a poor radar reflector making its radar reflection return virtually indistinguishable from the reflection return of the surrounding area. The efficiency of radar search would therefore be materially increased by providing a radar reflector at the point at which personnel or equipment is afloat. For use as an emergency "ditching" device it is desirable that such a radar reflector be water-borne, self-floating, and capable of being folded into a compact light-weight package which may be expanded to form relatively large radar reflecting surfaces.

The present invention is directed to the provision of a self-floating, collapsible radar reflector unit. To this end the invention comprises a flexible radar reflector enclosed within and directly attached to a radar-transparent, inflatable balloon. Thus, by proper design of the reflector and the contour of reflector attachment, the reflector may be erected to a predetermined geometry by inflation of the balloon. Wherever the geometry permits the reflector should be attached to the balloon continuously at its peripheries. Closely spaced points of attachment should be included within the meaning of the term "continuously" as used in this specification and the appended claims. If the geometry of the enclosed reflector divides the balloon into separate airtight compartments, openings may advantageously be pierced through the dividing partitions to permit the equalization of air pressure within the balloon without the use of a multiplicity of air inlets.

The reflector is directly attached to the balloon in order to prevent vibration therebetween which might otherwise stress and weaken the means of attachment sufficiently to tear the reflector from the balloon. Vibration would also result in distortion of the reflector geometry by displacing the direction of the forces exerted by the balloon which erect and maintain the reflector in position. These factors are of particular importance in a floating unit because of the violent stresses caused by the turbulent seas to which the unit is subject. Direct reflector attachment, however, may necessitate the provision of means for limiting the expansion of the balloon in order to prevent rupture between the reflector and the balloon.

Continuous peripheral attachment of the reflector to the balloon results in the application of forces evenly about the peripheries of the reflector thereby eliminating wrinkles in its surfaces and more accurately erecting it to a predetermined geometry.

The most effective radar reflector target in point of strength of radar reflection return is a planar surface oriented perpendicularly to the incident radar beam. As the incident beam departs from the perpendicular, however, the strength of radar return diminishes rapidly. A single planar reflector therefor will not provide optimum results in the present invention. Corner reflectors comprising three mutually perpendicular intersecting planes, however, are eminently suited for such use since they provide strong radar return over a wide range of incident radar beam angles.

Efficient corner reflectors should be accurately formed and it is important that the reflecting surfaces thereof should be and remain flat for optimum radar return, and additionally that the intersecting planes form an accurate 90° corner. Otherwise the radar return from one part of the corner reflector will be out of phase with the return from another part thereby resulting in destructive interference which reduces the signal return of the reflector. The present invention is capable of forming an accurately oriented corner reflector the geometry of which will not be affected by the turbulent conditions to which a water-borne unit is subject.

Heretofore most corner reflectors have been made triangular in shape so that they could be constructed with a minimum of rigid members. No such limitation exists in the present invention because of the support given the reflector by direct and continuous peripheral attachment to the inflated balloon. Thus, given a limiting maximum dimension, more reflecting surface area may be presented to the searching radar beam thereby extending the range at which the radar reflector unit may be detected.

The invention can best be understood by referring to the accompanying drawing, in which.

Figure 1:
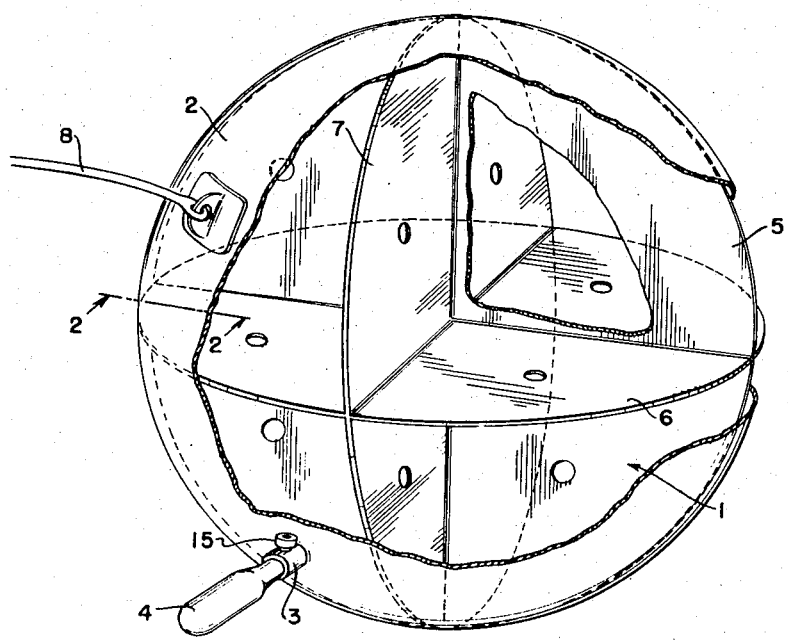
Fig. 1 is a partially cutaway perspective view of a radar reflector unit in accordance with this invention.

Referring to Fig. 1, the unit comprises a corner reflector 1 enclosed within and attached to an inflatable balloon 2. The balloon may be inflated manually or, as illustrated in Fig. 1, by a charged gas cartridge 4 having access to the interior of the balloon through an intake 3. A lanyard 8 is provided so that the balloon may be attached to the object to be located. The balloon should be fabricated of a strong nonporous, radar transparent material that is also flexible and light-weight so that it may be folded into a compact and portable package. The exterior of the balloon is advantageously colored to attract visual attention against a water background. A convenient diameter for the balloon is approximately three feet, but this may of course be varied.

The reflector 1 within the balloon should also be fabricated of a strong flexible, and light-weight material. When the balloon is inflated, the reflector is erected so as to form three mutually perpendicular intersecting planes 5, 6 and 7, each of the planes being cemented continuously about its periphery to the inner surface of the balloon substantially along great circles thereof. The reflector, therefore, forms eight corners each of which gives strong radar reflection return regardless of the direction of radar illumination in its octant. Openings are pierced into the three planes in order to permit the inflating gas pressure to be equalized throughout the balloon.

Preferably the unit is constructed by fabricating the balloon in two hemispheres which are cemented to each other and about the reflector. "Mylar" polyester film is ideally suited as the material for both the reflector and balloon. "Mylar" is the trademark for a plastic formed of highly polymeric long-chain polyesters of dicarboxylic acid and glycol and is manufactured by E. I. du Pont de Nemours, Inc. It is durable, water-repellent, chemically resistant, has a high tensile and impact strength and remains flexible and stable over a range of temperatures from minus 60° C. to 150° C. The reflector is formed by surfacing the "Mylar" with a thin, smooth and continuous film of metal, preferably aluminum. The well known process of depositing metal by vacuum evaporation is advantageously used for this purpose.

Figure 2:
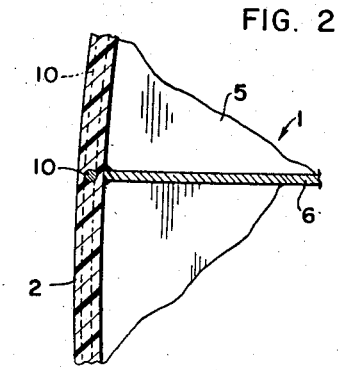
Fig. 2 is a partial sectional view taken along line 2—2 of Fig. 1 illustrating means for limiting balloon expansion.

The balloon need not, but may be fabricated of expandible material. In that event it is advisable to provide the balloon with some means for limiting its expansion along the contour of reflecting attachment in order to prevent rupture and separation of the reflector from the balloon due to overinflation. In Fig. 2 the balloon 2 is provided with embedded seams of flexible but inexpandible cords 10, which described great circles bordering the planes of the enclosed corner reflector 1.

Figure 3:
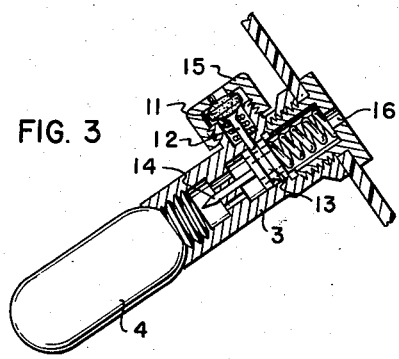
Figure 3 is a sectional view illustrating an exemplary inflation means.

A preferred embodiment of the invention has been described. Various changes and modifications however may be made within the scope of the invention as set forth in the appended claims. For example, the balloon inflating means 4 may be provided with a timing device adapted to delay the inflation of the balloon for a predetermined interval. This timing device can be in the nature of the device shown and described in the patent to Muller, No. 1,329,990, issued February 3, 1920, and entitled "Automatic Life Saving Apparatus." That patentee describes apparatus such as inflatable collars and belts for saving life at sea, which automatically inflate on contact with water. He describes how a a rapid inflation can be obtained by the use of a paper ring which soaks up water and breaks to allow compressed gas to be released to cause the item to inflate, but also describes an alternate arrangement in which sugar may be employed instead of the paper ring so that the apparatus will not inflate immediately upon contact with water. It is brought out in the patent that sugar provides a 10 to 12 second delay. Other patents recite different materials, such as the patent to Musser et al., No. 2,627,998, wherein a water soluble sleeve of 40% lactose and 60% fused borax is employed in a similar application. In the Ivie Patent No. 2,701,886, the patentee describes how an aspirin tablet may be employed to achieve automatic inflation of similar gear, and the Fox Patent Nos. 2,684,784 and 2,722,342 recite other water soluble substances such as flour, chalk or gelatine. As should be obvious, we do not predicate invention upon the timing device per se, and any suitable timing device may be used for obtaining the desired delay in the instant apparatus. For example, as shown in Figure 3, the exemplary version of a charged gas cartridge arrangement can be so constructed that the neck of cartridge 4 is punctured as a result of a soluble tablet 11 being dissolved upon contact with water Release pin 12 is spring biased away from slotted piston 13, upon which piston is mounted firing pin 14. Upon water entering apertured tablet housing 15, it causes the tablet to dissolve, and after a short time interval, firing pin 14 is spring driven toward the cartridge 4 to puncture it and allow its contents to escape into the balloon through port 16 to bring about desired delayed inflation of the balloon. This modification permits the collapsed unit to be submerged with an object for a selected time interval, after which interval the balloon inflates, buoying the object to the water's surface where the expanded radar reflector assumes its position indicating function. The unit so modified may therefore be employed in a variety of underwater research projects including, as an example, the detection and plotting of underwater currents.

We claim:

1. A water-borne, self-floating radar reflector unit comprising a flexible radar reflector, and a radar-transparent, inflatable balloon, said radar reflector being enclosed within and directly attached to said balloon along an inner surface thereof, the peripheries of said reflector being continuously attached to said balloon, the contour of said attachment being so chosen that said reflector is erected to a predetermined geometry when said balloon is inflated.

2. A water-borne, self-floating radar reflector unit in accordance with claim 1 in which the said balloon is provided with means for substantially limiting its expansion along the contour of said attachment.

3. A radar reflector unit capable of being compacted into a small space comprising flexible radar reflector, and a radar transparent envelope capable of being inflated into three-dimensional form, said radar reflector being enclosed within said envelope with the peripheral surfaces of the reflector being continuously attached to the inner surfaces of the envelope, the geometry of the attachment being so chosen that the reflector will be disposed in a predetermined corner reflector form when said envelope is in an inflated condition, and expansion limiting means embedded in said envelope for insuring that the reflector will be supported by said envelope in the desired, predetermined configuration.

4. A water-borne, self-floating radar reflector unit comprising a flexible radar corner reflector formed by three mutually perpendicular, intersecting planes, and a radar-transparent, inflatable balloon, said radar reflector planes being enclosed within and directly and continuously attached at their peripheries to said balloon along an inner surface thereof, the geometry of said attachment being so chosen that said reflector is erected to its predetermined corner reflector form when said balloon is inflated.

5. A water-borne, self-floating radar reflector unit comprising a flexible radar corner reflector formed by three mutually perpendicular, intersecting planes, and a radar-transparent, inflatable, substantially spherical balloon, said radar reflector planes being enclosed within and directly attached at their peripheries to said balloon substantially along great circles thereof, the geometry of said attachment being so chosen that said reflector is erected to its predetermined corner reflector form when said balloon is inflated.

6. A water-borne, self-floating radar reflector unit comprising a flexible radar corner reflector formed by three mutually perpendicular, intersecting planes, a radar-transparent, inflatable, substantially spherical balloon, said radar reflector planes being enclosed within and directly attached at their peripheries to said balloon substantially along great circles thereof, the geometry of said attachment being so chosen that said reflector is erected to its predetermined corner reflector form when said balloon is inflated, and means for substantially limiting the expansion of said balloon along the contour of said attachment.

7. A water-borne, self-floating radar reflector unit in accordance with claim 6 in which the expansion limiting means comprises seams of inexpandible material embedded within said balloon and arranged to border said reflector planes.

8. A water-borne, self-floating radar reflector unit comprising a flexible radar corner reflector formed by three mutually perpendicular, intersecting planes, and a radar-transparent, inflatable, substantially spherical balloon, said radar reflector planes being enclosed within and directly attached at their peripheries to said balloon substantially along great circles thereof, the geometry of said attachment being so chosen that said reflector is erected to its predetermined corner reflector form when said balloon is inflated, said reflector planes having openings pierced therethrough to permit the equalization of gas pressure within said balloon.

9. A water-borne, self-floating radar reflector unit comprising a flexible radar reflector, a radar-transparent, inflatable balloon, said radar reflector being enclosed within and continuously attached along its periphery to said balloon along an inner surface thereof, the contour of said attachment being so chosen that said reflector is erected to a predetermined geometry when said balloon is inflated, and means for inflating said balloon at the end of a predetermined time interval.

10. A water-borne, self-floating radar reflector unit comprising a flexible radar corner reflector formed by three mutually perpendicular, intersecting planes, a radar-transparent, inflatable balloon, said radar reflector planes being enclosed within and directly and continuously attached at their peripheries to said balloon along an inner surface thereof, the geometry of said attachment being so chosen that said reflector is erected to its predetermined corner reflector form when said balloon is inflated, and means for inflating said balloon at the end of a predetermined time interval.

References Cited in the file of this patent

UNITED STATES PATENTS

| | | |
|---|---|---|
| 2,463,517 | Chromak | Mar. 8, 1949 |
| 2,534,716 | Hudspeth | Dec. 19, 1950 |